US007142837B1

(12) United States Patent
Small

(10) Patent No.: US 7,142,837 B1
(45) Date of Patent: Nov. 28, 2006

(54) MULTIPLE-SECTION BANDPASS FILTER FOR BROADCAST COMMUNICATIONS

(75) Inventor: Derek J. Small, Raymond, ME (US)

(73) Assignee: Myat, Inc.NJ (US)

( * ) Notice: Subject to any disclaimer, the term of this patent is extended or adjusted under 35 U.S.C. 154(b) by 394 days.

(21) Appl. No.: 10/833,935

(22) Filed: Apr. 28, 2004

(51) Int. Cl.
*H04B 1/16* (2006.01)
*H01P 7/00* (2006.01)

(52) U.S. Cl. ....................... 455/339; 455/334; 333/219

(58) Field of Classification Search ................ 455/334, 455/338, 339, 280, 269, 130; 333/202, 219, 333/208, 212, 230
See application file for complete search history.

(56) References Cited

U.S. PATENT DOCUMENTS 4,630,009 A * 12/1986 Tang ........................ 333/28 R
5,867,077 A * 2/1999 Lundquist .................. 333/208
5,936,490 A * 8/1999 Hershtig ..................... 333/202
6,232,852 B1 * 5/2001 Small et al. ................ 333/208
6,236,292 B1 * 5/2001 Hershtig ..................... 333/212
6,300,850 B1 * 10/2001 Kaegebein .................. 333/222
6,342,825 B1 * 1/2002 Hershtig ..................... 333/202

* cited by examiner

*Primary Examiner*—Sonny Trinh
(74) *Attorney, Agent, or Firm*—Rissman Jobse Hendricks & Oliverio, LLP

(57) ABSTRACT

A multiple-section bandpass filter for broadcast communications includes adjacent waveguide segments with a perpendicular connecting segment between them to form a U-shaped signal path. The waveguide cavities of the segments may be extruded and rectangular in cross section, and have a groundplane spacing that allows signal propagation between filter sections by evanescent coupling. Resonators in each of the adjacent segments have a separation that establishes the coupling bandwidths without the need for passive decoupling structures. A cross coupling conductor between the adjacent segments provides a capacitive or inductive coupling between them. A decoupling structure may be located in the connecting segment.

20 Claims, 4 Drawing Sheets

MULTIPLE-SECTION BANDPASS FILTER FOR BROADCAST COMMUNICATIONS

FIELD OF THE INVENTION

This invention relates generally to the field of electromagnetic signal communication and, more specifically, to the filtering of high power signals for broadcast communications.

BACKGROUND OF THE INVENTION

In the field of broadcast communications, electrical filters are required to separate a desired signal from energy in other bands. These bandpass filters are similar to bandpass filters in other fields. However, unlike most other electrical bandpass filters, filters for broadcast communication must be capable of handling a relatively high input power. For example, a signal input to a broadcast communications filter might have an average power between 5 and 100 kilowatts (kW). Many electronic filters do not have the capacity for such large signal powers.

For many years, high power electrical bandpass filtering has included the use of waveguide cavity filters. A variety of different waveguide filter types have evolved, each having its particular benefits and drawbacks. One popular class of filter in the industry is based on a pseudo-elliptical filter function. This type of filter function may be achieved in a number of different ways. Some waveguide bandpass filters make use of the "evanescent mode" to provide coupling between the separate resonators of a filter. In an evanescent mode filter, the waveguide is "below cutoff" (i.e., having a cross-sectional dimension small enough that frequencies within a desired passband cannot proceed normally from one end of the cavity to the other). In such a filter, resonances are formed between the inductance of a section of the waveguide, and the capacitance of a resonator, typically in the form of an adjustable length element projecting into the cavity, such as a tuning screw.

SUMMARY OF THE INVENTION

In accordance with the present invention, a multiple-section bandpass filter is provided for filtering broadcast communications in a predetermined frequency band. The filter operates in evanescent mode and has coupling bandwidths between adjacent filter sections that establish a frequency band for the filter between $f_L$ and $f_H$. The filter has a waveguide that includes a first segment and a second segment adjacent to each other in a direction perpendicular to the signal propagation direction of each segment, and a connecting segment that has a perpendicular orientation to that of the first and second segments. The connecting segment connects a cavity of the first segment with a cavity of the second segment to form a continuous cavity through which a signal propagates along a substantially U-shaped path. As evanescent mode cavities, each of the waveguide segments has a predetermined groundplane spacing that creates a lower cutoff frequency $f_C=c/2a$ that is higher that $f_H$, where "c" is the speed of light and "a" is the groundplane spacing.

Within each of the first and second waveguide segments are resonators, each of which comprises a conductor that extends into the waveguide in a direction substantially perpendicular to the direction of signal propagation. Coupling bandwidths in the filter are established by the physical separation between adjacent resonators in each of the first and second waveguide segments, without the need for a passive decoupling structure located between them. The filter also includes a cross coupling conductor, for example, a coaxial conductor, that is connected between the first and second waveguide segments and that provides capacitive coupling between a resonator of the first waveguide segment and a resonator of the second waveguide segment to create additional transmission zeroes for the filter. An inductive coupler could also be used that would provide delay equalization to the filter.

The first and second waveguide segments may have a physical separation between them, and may have a rectangular outer shape, although other shapes are also possible. The waveguide cavities may be formed by an extrusion process which provides a low-cost means of production. Adjustable coupling screws located between adjacent resonators may be provided to allow adjustment of the relative coupling between them. In addition, a decoupling structure, which may be adjustable, can be provided in the connecting segment to allow a certain amount of decoupling between resonators of the first and second waveguide segments.

BRIEF DESCRIPTION OF THE DRAWINGS

The above and further advantages of the invention may be better understood by referring to the following description in conjunction with the accompanying drawings in which.

DETAILED DESCRIPTION

Figure 1:
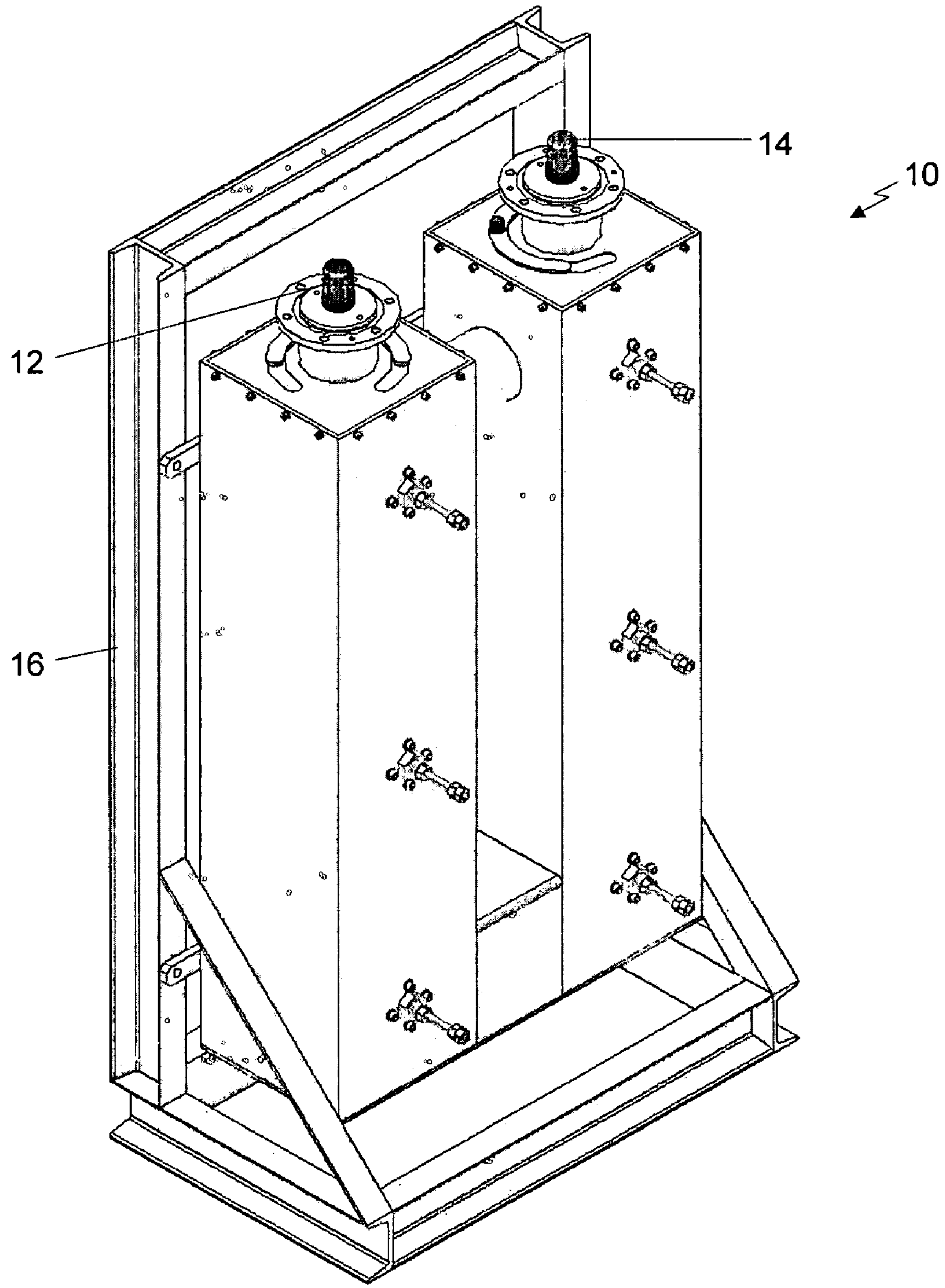
FIG. 1 is a perspective view of a filter according to the present invention.

FIG. 1 is a perspective view of an evanescent mode waveguide cavity bandpass filter 10 that might be used for suppression of signals outside of the pass band at the output of a high power transmitter. The filter is a six-section filter having an input coaxial terminal 12 and an output coaxial terminal 14. The filter cavity has a rectangular cross section, although those skilled in the art will recognize that other filter shapes are also possible. In the filter shown in FIG. 1, the cavity structure is extruded aluminum, which provides good performance while maintaining a relatively low cost of manufacture. The overall shape of the filter is "folded" in the sense that the filter path follows roughly a "U-shape," so that the major segments are adjacent to each other and the input and output ports are on the same physical side of the filter. In the arrangement shown in the figure, the waveguide cavities are rigidly fixed to a support bracket 16 for support and mounting purposes.

Figure 2:
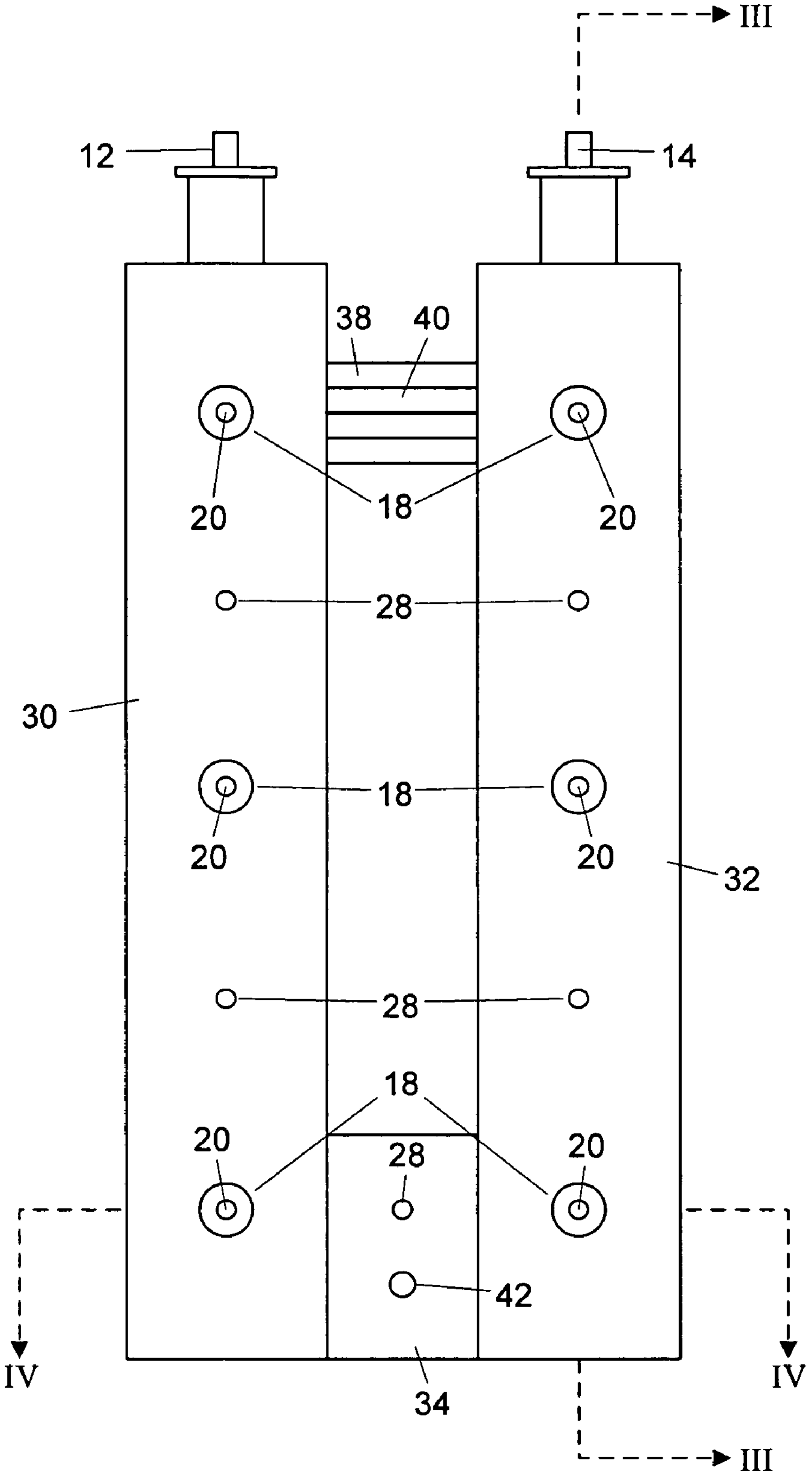
FIG. 2 is a schematic cross-sectional view of a filter such as that shown in FIG. 1.

A cross-sectional, schematic side view of the filter is shown in FIG. 2. The filter includes waveguide segments 30 and 32, each of which contains three filter sections, and a connecting waveguide segment 34 that connects segments 30 and 32. In each of the filter sections is located a "resonator" 18, which is a conductive post that forms the filter section along with the waveguide. Each resonator 18 includes a tuning screw 20 that is threaded and that may consist of a material having a low coefficient of thermal expansion, such as a threaded rod of INVAR® (a registered trademark of Imphy, S. A., Paris, France). When turned, the screw changes the distance that a conductive portion of the resonator extends into the cavity, allowing fine tuning of the resonant frequency of that cavity. Between each pair of adjacent resonators 18 are coupling screws used to fine tune the coupling between those resonators. A signal input at the input terminal 12 is coupled from one filter section to the next along the length of the filter until finally reaching the output terminal 14. The basic structure of the resonators and tuning screws is more clearly shown in FIG. 3, which is a cross section of one portion of the filter as indicated by the section line III—III shown in FIG. 2.

Figure 3:
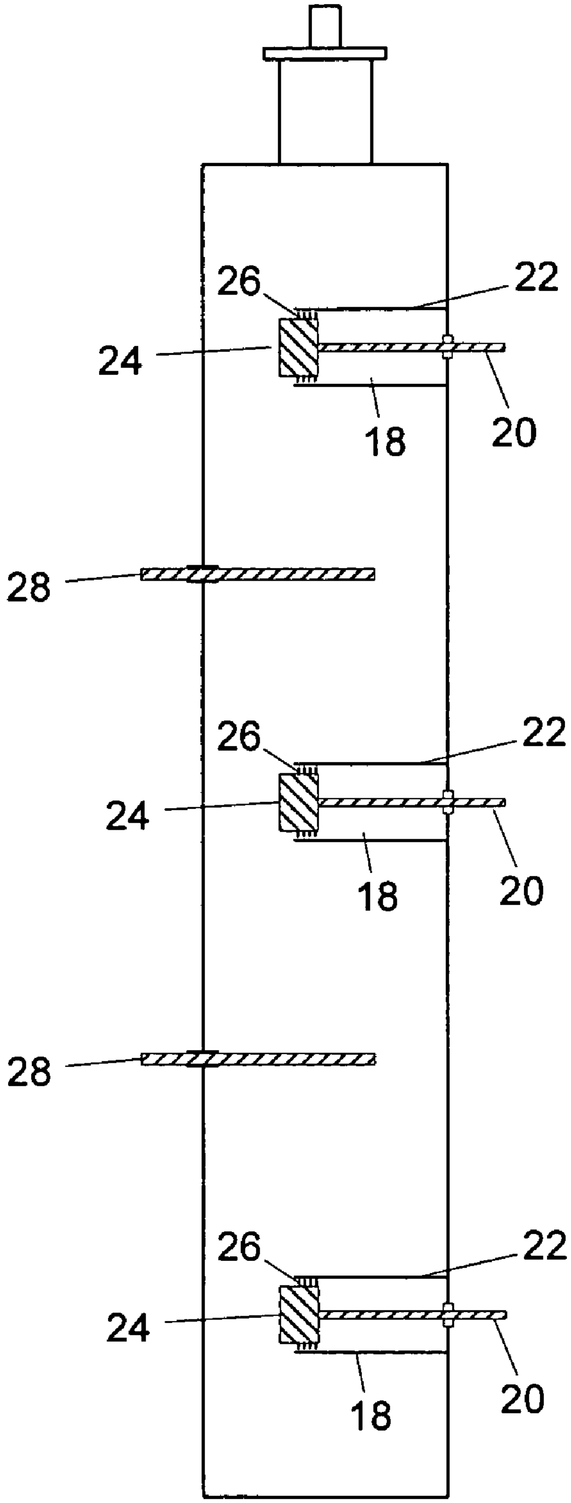
FIG. 3 is a schematic cross-sectional view of one segment of a filter such as that shown in FIG. 1.

As shown in FIG. 3, each resonator 18 consists of a copper tube 22 within which is located a copper plunger 24 attached to the tuning screw 20 for that resonator. Spring fingers 26 attached to the plunger provide electrical contact between the plunger 24 and the tube 22. Threads on the tuning screw 20 mate with a bracket on the waveguide surface, such that rotation of the screw 20 controls the degree to which the plunger 24 extends into the cavity, thereby changing the effective "length" of the conductive segment. This, in turn, causes slight changes in the resonant frequency, allowing fine tuning of the filter sections.

The filter uses evanescent mode coupling between resonators. That is, the waveguide sections have a groundplane spacing that is small enough that they have a cutoff frequency higher than the operating frequency of the filter, so that the signal propagation through the filter is via evanescent modes. For example, for a filter operating at a frequency of 500 MHz, the waveguide cavity may have a spacing of 7.75 inches, which establishes a cutoff frequency of approximately 762 MHz. The operation of the filter "below cutoff" creates a reactance in each filter section that, together with the capacitance of an adjacent resonator 18, forms a resonant circuit having a particular resonant frequency. This resonance may be adjusted by adjusting the tuning screw attached to the plunger of the resonator.

With the spacing of the resonators along the length of the waveguide, there is coupling of the resonances from one filter section to the next. The degree of coupling between adjacent sections is controlled through the use of coupling screws 28, each of which is positioned between two adjacent resonators 18. Threads of each screw 28 mesh with a bracket on the waveguide surface, so that rotation of the screw changes the extent to which it extends into the waveguide cavity and inhibits capacitive coupling between the adjacent resonators. In this way, the relative coupling from one resonator to the next may be controlled.

Vanes separating one filter section from the next are common in the prior art for decoupling one section from the other. However, in the waveguide segments 30, 32, spacing of the resonators themselves is used to establish a default level of decoupling. That is, the physical distance from one resonator to the next is used to establish the degree of coupling between adjacent resonators. While this results in a longer waveguide for the given number of sections, the filter benefits from a substantially higher quality factor "Q" than exists in similar filters having vanes separating the sections.

The use of increased resonator spacing to establish a desired decoupling between filter sections is also notable with regard to the two resonators furthest from the input and output terminals. Referring again to FIG. 2, if the resonators are numbered from input to output along the length of the waveguide, with the resonator adjacent to the input terminal being the first, and the resonator adjacent to the output terminal being the sixth, the third and fourth resonators reside at the side of the filter opposite the input and output terminals. The two waveguide sections could be placed directly next to each other, and a vane used between the third and fourth resonators to provide the necessary decoupling. However, in the embodiment of FIG. 2, a larger separation between the third and fourth resonators is used to maximize the Q factor of the filter.

Figure 4:
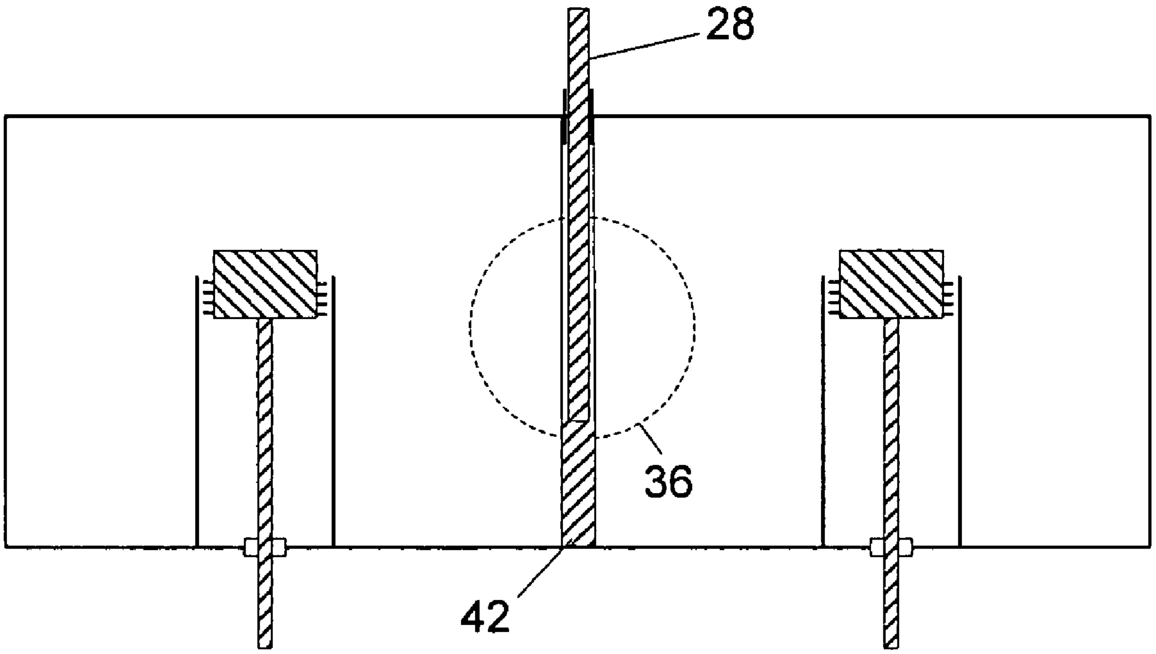
FIG. 4 is a schematic cross-sectional view of a filter such as that shown in FIG. 1 in the vicinity of a connecting waveguide segment of the filter.

Because of the spacing between the third and fourth resonators, it is necessary to separate the two waveguide sections from each other. As shown in FIG. 2, the first segment 30 is physically separated from the second segment 32, and additional connecting waveguide segment 34 is located between the third and fourth resonators to provide continuity. A cross-sectional view of this segment, taken along line IV—IV of FIG. 2, is shown schematically in FIG. 4. As shown, this segment of the waveguide is similar to the two larger segments, and provides additional separation between the third and fourth resonators of the filter. However, in the embodiment shown, the separation between the third and fourth resonators is not as great as between the other adjacent resonators. The reason for this is discussed in more detail below In this particular filter embodiment, it is desirable to have a cross coupling between non-adjacent resonators of the first waveguide segment 30 and the second waveguide segment 32. To this end, a coupling path 38 (as shown in FIG. 2) is provided that couples the first filter section to the sixth filter section. The coupling path 38 might also be provided between other resonators, such as between the second and the fifth. In the embodiment shown, the coupling path 38 contains a coaxial conductor 40 that extends from the first filter section to the sixth, and provides the necessary capacitive coupling. This cross coupling introduces additional transmission zeroes into the filter function, which provide the filter with a greater number of rejection points. However, the cross coupling conductor can not be too long, or it will create a resonance in the filter that comes too close to the filter pass band. Therefore, the separation between the waveguide segments 30, 32 is limited, and does not reach the point at which the separation between the third and fourth resonators is, by itself, sufficient to provide the desired degree of decoupling. Therefore, as shown in FIG. 4, a post 42 is located between the third and fourth resonators to provide an additional degree of decoupling, while still keeping the separation between the resonators, and therefore the Q factor, as high as possible. A tuning screw 28 is also provided between the third and fourth resonators to allow fine tuning of the coupling between them. In addition, an access hole 36 is provided in the surface of this waveguide segment furthest from the location of the input and output terminals.

The following is an example of a broadcast waveguide filter according to the present invention. Those skilled in the art will recognize that this is an example for descriptive purposes only, and should not be considered limiting of the overall scope of the invention. In this example, the filter has the form shown in FIGS. 1–4. The filter is designed to provide filtering for a selected pass band of approximately 6 MHz within a a range of 470 MHz to 488 MHz. Different filter dimensions would be used for pass bands in other frequency ranges. The waveguide is extruded aluminum having a square cross section and a groundplane spacing of 7.75 inches. Each of the resonators of the filter has a copper tube with a diameter of 2 inches, and the separation between the resonators, from the center of one to the center of the next, varies depending on their position in the cavity. The separation between the first and second resonators is 12.3 inches, as is the separation between the fifth and sixth resonators. The separation between the second and third resonators is 13.8 inches, as is the separation between the fourth and fifth resonators. The tuning screws 28 located between the resonators are equidistant from each resonator.

In this example, the third and fourth resonators are separated by a distance of 13 inches, with the tuning screw located between them and equidistant to each. The post for providing additional decoupling is equidistant from the third and fourth resonators, and positioned 2.625 inches from the waveguide wall 35. Like the waveguide portions 30, 32, waveguide portion 34 has a groundplane spacing of 7.75 inches. With this separation between the third and fourth resonators, the length of the cross coupling conductor 40 is 5.62 inches. At this length, there is no risk of the conductor having a resonance too close to the desired pass band. The spacing between all of the resonators also contributes to a relatively high unloaded quality factor "$Q_U$." For this particular design, the $Q_U$ of the filter is approximately 10,500.

While the invention has been shown and described with reference to a particular embodiment thereof, it will be recognized by those skilled in the art that various changes in form and detail may be made herein without departing from the spirit and scope of the invention as defined by the appended claims.

What is claimed is:

1. A multiple-section bandpass filter for filtering broadcast communications, the filter having coupling bandwidths between adjacent filter sections that establish a frequency band for the filter between $f_L$ and $f_H$, the filter comprising:

a waveguide having a first segment and a second segment adjacent to each other in a direction perpendicular to the signal propagation direction of each segment, and a connecting segment that has a perpendicular orientation to that of the first and second segment and that connects a cavity of the first segment with a cavity of the second segment to form a continuous cavity through which a signal propagates along a substantially U-shaped path, each segment of the waveguide having a predetermined groundplane spacing that creates a lower cutoff frequency $f_C > f_H$, the filter segments being arranged to allow signal propagation;

a plurality of resonators located in each of the first and second waveguide segments, each resonator comprising a conductor that extends into the waveguide in a direction substantially perpendicular to the direction of signal propagation, adjacent resonators in each of the first and second waveguide segments having a separation that establishes said coupling bandwidths without the need for a passive decoupling structure being located between them; and a cross coupling conductor connected between the first and second waveguide segments that provides capacitive or inductive coupling between a first resonator of the first waveguide segment and a second resonator of the second waveguide segment, wherein the first and second resonators are not adjacent to each other along the signal path.

2. A filter according to claim 1 wherein there is a physical separation between the first segment and the second segment.

3. A filter according to claim 1 wherein the waveguide segments each have a rectangular cross section.

4. A filter according to claim 1 wherein the waveguide segments are formed by extrusion.

5. A filter according to claim 1 further comprising a coupling screw located between adjacent resonators that may be adjusted in how far it extends into a waveguide segment into which it extends.

6. A filter according to claim 1 wherein the cross-coupling conductor comprises a coaxial conductor.

7. A filter according to claim 1 further comprising a decoupling structure located in the connecting segment that provides a predetermined amount of decoupling within the connecting segment.

8. A multiple-section bandpass filter for filtering broadcast communications, the filter having coupling bandwidths between adjacent filter sections that establish a frequency band for the filter between $f_L$ and $f_H$, the filter comprising:

a waveguide having a first segment comprising an extruded cavity and a second segment comprising an extruded cavity, the two segments being adjacent to each other in a direction perpendicular to the signal propagation direction of each segment, and a connecting segment that has a perpendicular orientation to that of the first and second segment and that connects the cavity of the first segment with the cavity of the second segment to form a continuous cavity through which a signal propagates along a substantially U-shaped path, each segment of the waveguide having a predetermined groundplane spacing that creates a lower cutoff frequency $f_C > f_H$, the filter segments being arranged to allow signal propagation;

a plurality of resonators located in each of the first and second waveguide segments, each resonator comprising a conductor that extends into the waveguide in a direction substantially perpendicular to the direction of signal propagation; and a cross coupling conductor connected between the first and second waveguide segments that provides capacitive or inductive coupling between a first resonator of the first waveguide segment and a second resonator of the second waveguide segment, wherein the first and second resonators are not adjacent to each other along the signal path.

9. A filter according to claim 8 wherein there is a physical separation between the first segment and the second segment.

10. A filter according to claim 8 wherein the waveguide segments each have a rectangular cross section.

11. A filter according to claim 8 wherein adjacent resonators in each of the first and second waveguide segments having a separation that establishes said coupling bandwidths without the need for a passive decoupling structure being located between them.

12. A filter according to claim 8 further comprising a coupling screw located between adjacent resonators that may be adjusted in how far it extends into a waveguide segment into which it extends.

13. A filter according to claim 8 wherein the cross-coupling conductor comprises a coaxial conductor.

14. A filter according to claim 8 further comprising a decoupling structure located in the connecting segment that provides a predetermined amount of decoupling within the connecting segment.

15. A method of constructing a multiple-section bandpass filter for filtering broadcast communications, the filter having coupling bandwidths between adjacent filter sections that establish a frequency band for the filter between $f_L$ and $f_H$, the filter comprising:

forming by extrusion a first waveguide segment and a second waveguide segment and securing the segments together adjacent to each other in a direction perpendicular to the signal propagation direction of each segment;

forming a connecting segment and locating it between the first segment and the second segment such that it has a perpendicular orientation to that of the first and second segment and connects a cavity of the first segment with a cavity of the second segment to form a continuous cavity through which a signal propagates along a substantially U-shaped path, each segment of the waveguide having a predetermined groundplane spacing that creates a lower cutoff frequency $f_C > f_H$, the filter segments being arranged to allow signal propagation;

locating a plurality of resonators in each of the first and second waveguide segments, each resonator comprising a conductor that extends into the waveguide in a direction substantially perpendicular to the direction of signal propagation; and providing a cross coupling conductor connected between the first and second waveguide segments that provides capacitive or inductive coupling between a first resonator of the first waveguide segment and a second resonator of the second waveguide segment, wherein the first and second resonators are not adjacent each other along the signal path.

16. A method according to claim 15 further comprising providing a physical separation between the first segment and the second segment.

17. A method according to claim 15 wherein the waveguide segments each have a rectangular cross section.

18. A method according to claim 15 further comprising providing adjacent resonators in each of the first and second waveguide segments with a separation that establishes said coupling bandwidths without the need for a passive decoupling structure being located between them.

19. A method according to claim 15 further comprising locating a coupling screw between adjacent resonators that may be adjusted in how far it extends into a waveguide segment.

20. A filter according to claim 15 further comprising locating a decoupling structure in the connecting segment that allows a predetermined amount of decoupling within the connecting segment.

* * * * *